(12) United States Patent
Chang et al.

(10) Patent No.: US 8,913,125 B2
(45) Date of Patent: Dec. 16, 2014

(54) ELECTRONIC DEVICE AND METHOD FOR REGULATING COORDINATES OF PROBE MEASUREMENT SYSTEM

(75) Inventors: Chih-Kuang Chang, New Taipei (TW); Zheng-Cai She, Shenzhen (CN); Zhong-Kui Yuan, Shenzhen (CN); Li Jiang, Shenzhen (CN); Yu-Hua Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 13/457,423

(22) Filed: Apr. 26, 2012

(65) Prior Publication Data

US 2013/0027544 A1    Jan. 31, 2013

(30) Foreign Application Priority Data

Jul. 27, 2011   (CN) .......................... 2011 1 0211969

(51) Int. Cl.
| | |
|---|---|
| H04N 7/18 | (2006.01) |
| G01B 11/03 | (2006.01) |
| G01B 21/04 | (2006.01) |
| G01B 11/14 | (2006.01) |

(52) U.S. Cl.
CPC ............... *G01B 11/03* (2013.01); *G01B 21/04* (2013.01)
USPC ............................................ 348/135; 356/51

(58) Field of Classification Search
USPC ......................................................... 348/135
See application file for complete search history.

(56) References Cited

U.S. PATENT DOCUMENTS

| | | | | |
|---|---|---|---|---|
| 5,285,397 | A * | 2/1994 | Heier et al. ................... | 702/167 |
| 7,973,942 | B2 * | 7/2011 | Iyoki et al. .................... | 356/614 |
| 2013/0120562 | A1 * | 5/2013 | Chang et al. ................. | 348/135 |
| 2013/0201326 | A1 * | 8/2013 | Tsujii ........................... | 348/135 |
| 2014/0176935 | A1 * | 6/2014 | Maslennikov et al. ......... | 356/51 |

* cited by examiner

*Primary Examiner* — Sath V Perungavoor
*Assistant Examiner* — Howard D Brown, Jr.
(74) *Attorney, Agent, or Firm* — Novack Druce Connolly Bove + Quigg LLP

(57) ABSTRACT

In a method for regulating coordinates of a probe measurement system using an electronic device, the method determines a first center of a reference object using a probe measurement system, and a second center of the reference object using an image measurement system. The method further determines regulation values between the probe measurement system and the image measurement system by calculating difference values between coordinates of the first center and the second center of the reference object, and stores the regulation values in a storage device of the electronic device.

20 Claims, 9 Drawing Sheets

ELECTRONIC DEVICE AND METHOD FOR REGULATING COORDINATES OF PROBE MEASUREMENT SYSTEM

BACKGROUND

1. Technical Field

Embodiments of the present disclosure relate to object measuring technology, and particularly to an electronic device and method for regulating coordinates of a probe measurement system of an object measuring machine.

2. Description of Related Art

Measurement is important in product manufacturing to ensure product quality. In recent years, probe measurement system and image measurement system have been used to measure an object. The probe measurement system measures the object by contacting a large number of points on a surface of the object using a probe, and the image measurement system measures the object by capturing an image of the object using a charge coupled device (CCD) lens module.

However, the probe measurement system cannot use the probe to measure the object if the image measurement is used. Therefore, a more efficient method for measuring the object using both the probe measurement system and the image measurement system is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
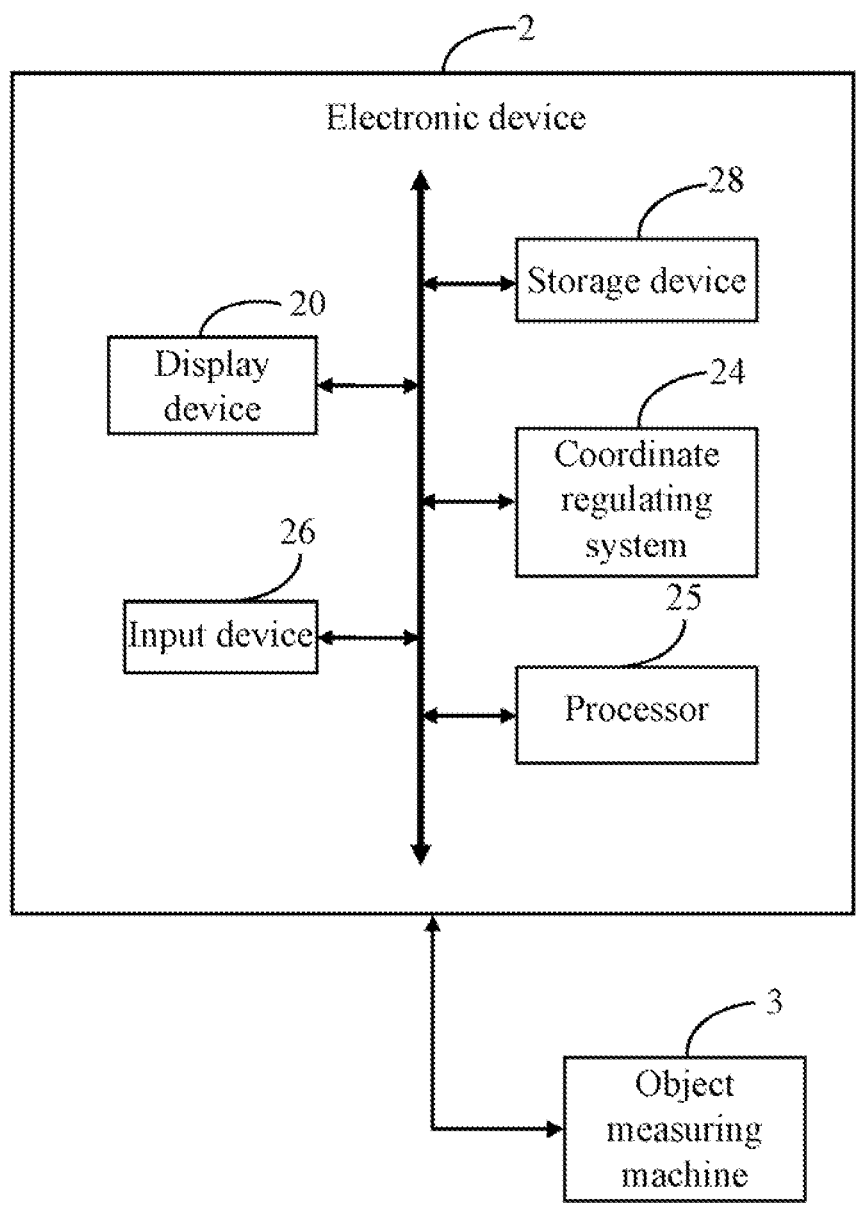
FIG. 1 is an schematic diagram of one embodiment of an electronic device including a coordinate regulating system.

FIG. 1 is an schematic diagram of one embodiment of an electronic device 2 including a coordinate regulating system 24. The electronic device 2 may be connected with an object measuring machine 3 through a network. For example, the network may be the Internet, an intranet, or any other relevant network.

The electronic device 2 further includes a display device 20, an input device 26, a storage device 28, and at least one processor 25. The electronic device 2 may be a computer, a server, or any other computing device. FIG. 1 illustrates only one example of the electronic device 2 that may include more or fewer components than as illustrated, or a different configuration of the various components may exist in other embodiments.

The display device 20 may be a liquid crystal display (LCD) or a cathode ray tube (CRT) display, and the input device 26 may be a mouse, a keyboard, a touch screen, and/or a touchpad used for inputting data.

Figure 4:
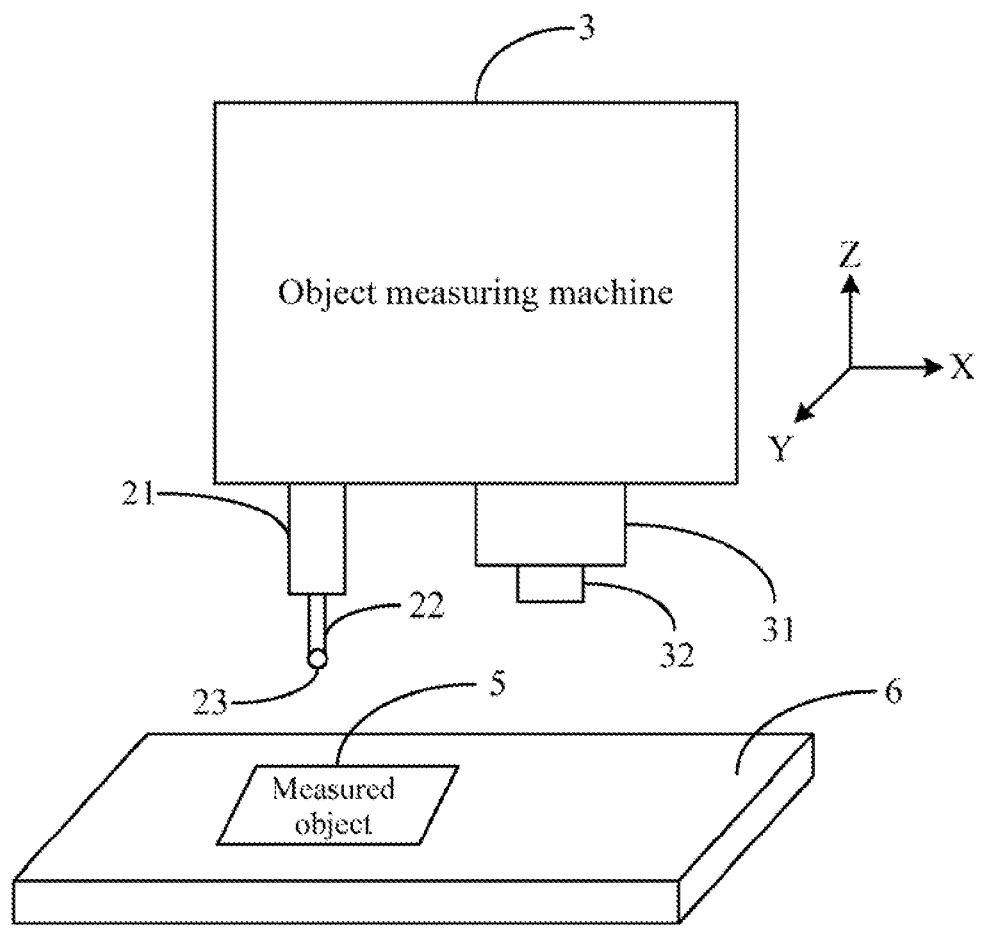
FIG. 4 is an schematic diagram of an example of an object measuring machine.

As shown in FIG. 4, the object measuring machine 3 may include, but is not limited to, a probe measurement system 21 and an image measurement system 31. A probe 22 is included on the probe measurement system 21, and a probe tip 23 is positioned on an end of the probe 22. The probe tip 23 is spherically shaped which can be used to contact different positions of a measured object 5 on a test table 6, and obtain coordinates of the contacted positions. The image measurement system 31 includes a lens module 32 which is used to capture an image of the measured object 5, and transfer the captured image to the electronic device 2. The lens module 32 may be a charge coupled device (CCD) lens module.

The coordinate regulating system 24 is used to regulate coordinates of the probe measurement system 21 to ensure that the measured object 5 can be tested using both the probe measurement system 21 and the image measurement system 31. In one embodiment, the coordinate regulating system 24 may include computerized instructions in the form of one or more programs that are executed by the at least one processor 25 and stored in the storage device 28 (or memory). A detailed description of the coordinate regulating system 24 will be given in the following paragraphs.

Figure 2:
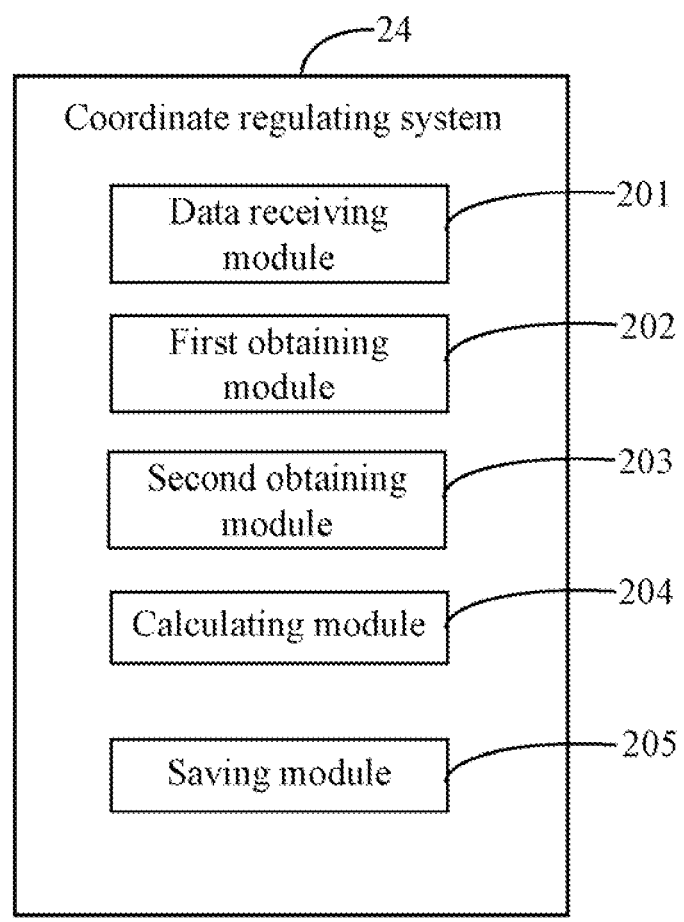
FIG. 2 is a block diagram of function modules of the coordinate regulating system included in the electronic device.

FIG. 2 is a block diagram of function modules of the coordinate regulating system 24 included in the electronic device 2. In one embodiment, the coordinate regulating system 24 may include one or more modules, for example, a data receiving module 201, a first obtaining module 202, a second obtaining module 203, a calculating module 204, and a saving module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3A:
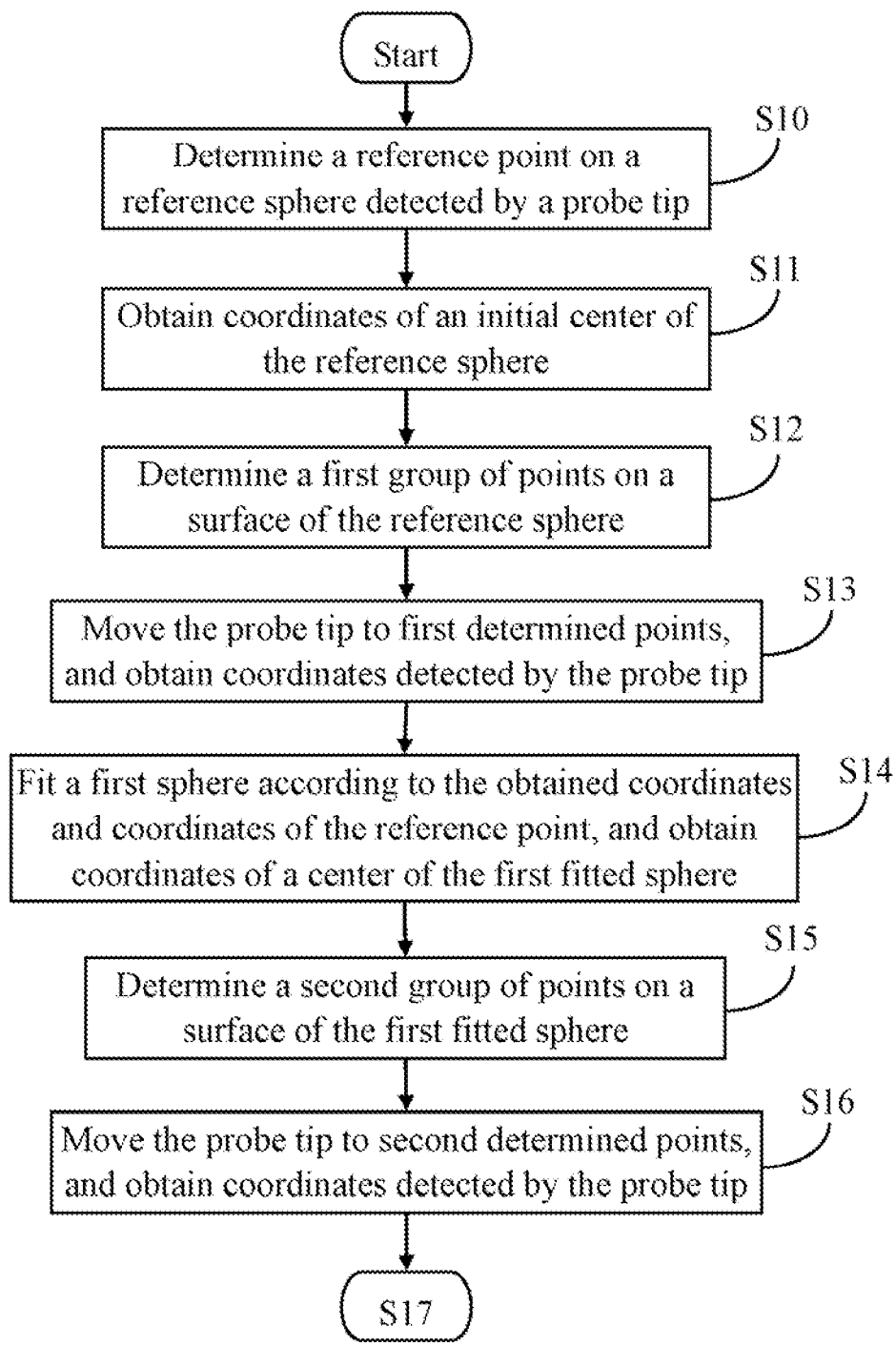
FIGS. 3A-3B are flowcharts of one embodiment of a method for regulating coordinates of a probe measurement system using the electronic device.
Figure 3B:
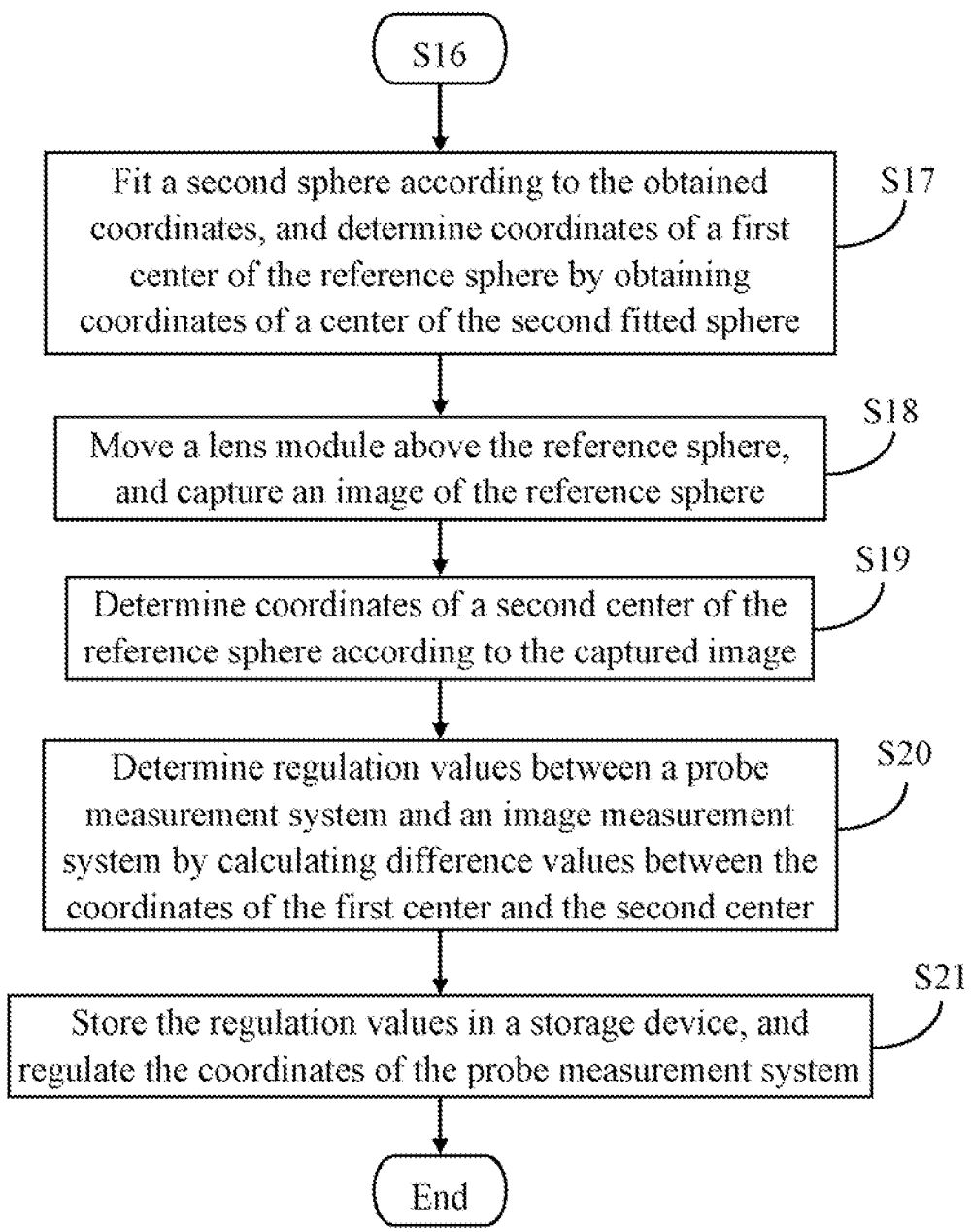

FIGS. 3A-3B are flowcharts of one embodiment of a method for regulating coordinates of the probe measurement system 21 using the electronic device 2. Depending on the embodiment, additional blocks may be added, others removed, and the ordering of the blocks may be changed.

Figure 5:
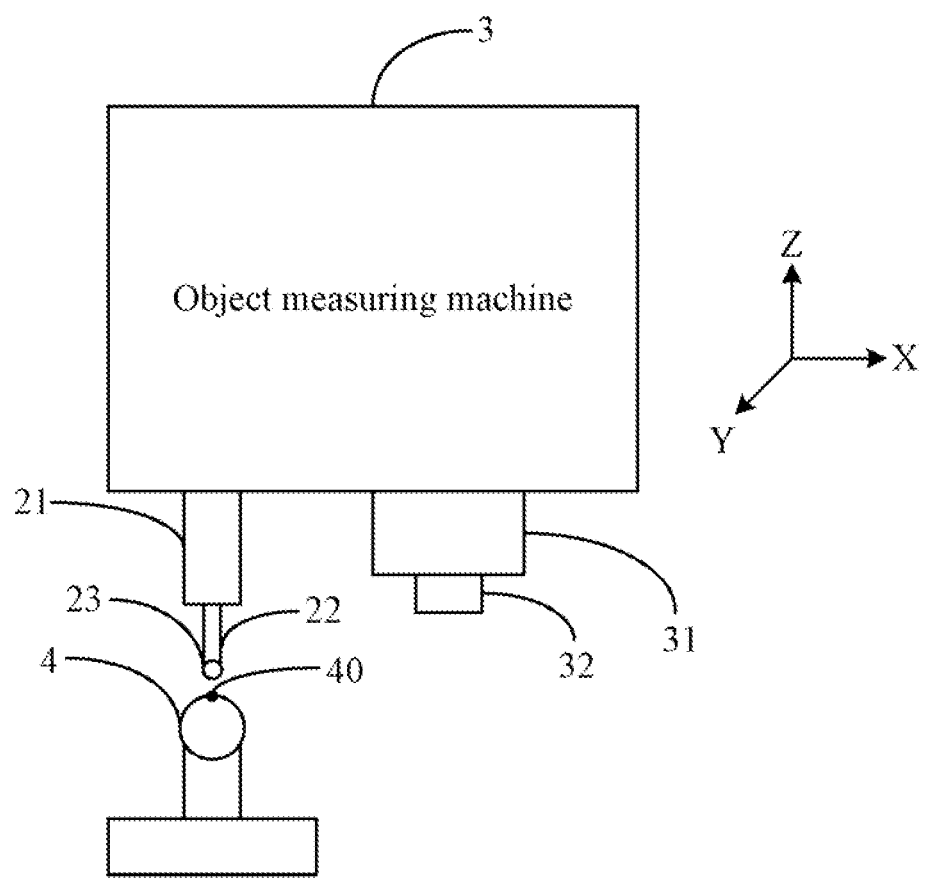
FIG. 5 is an schematic diagram of an example of selecting a reference point on a reference sphere using a probe measurement system.

In block S10, the data receiving module 201 determines a reference point 40 on a reference object 4 detected by the probe tip 23 if the storage device 28 does not store regulation values of the probe measurement system 21. As shown in FIG. 5, the reference object 4 may be a reference sphere (hereinafter referred to as "reference sphere"), and the reference point 40 may be a vertex of the reference sphere.

In block S11, the first obtaining module 202 obtains coordinates (x0, y0, z0) of an initial center of the reference sphere according to coordinates (x, y, z) of the reference point 40 detected by the probe tip 23, where (x0, y0, z0)=(x, y, z−r), and "r" represents a radius of the reference sphere.

In block S12, the first obtaining module 202 determines a first group of points (hereinafter referred to as "first determined points") on a surface of the reference sphere according to the coordinates (x0, y0, z0) of the initial center of the reference sphere. In one embodiment, a first determined point Pi(Xi, Yi, Zi) is determined by following formulae:

$$Xi = x0 + r \times \cos(\alpha) \times \cos((2*PI/3) \times i)$$

$$Yi = y0 + r \times \cos(\alpha) \times \sin((2*PI/3) \times i)$$

$$Zi = z0 - (r0 + r) + r \times \sin(\alpha)$$

In the above formulae, "r0" represents a radius of the probe tip 23, i={0, 1, ..., m−1}, "m" represents a quantity of the first determined points (e.g., m=3), "PI" represents a circumference ratio (e.g., PI=3.1415926). The angle of "α" is determined by obtaining a connection line between the first determined points "Pi" and the initial center of the reference sphere, calculating an included angle between the connection line and a reference plane of the reference sphere, and determining the included angle as the angle of "α". In other embodiment, the angle of "α" may be a preset value (e.g., sixty degrees).

In block S13, the first obtaining module 202 moves the probe tip 23 to the first determined points (i.e., the points in the first group of points) by controlling movement of the object measuring machine 3, and obtains coordinates of each of the first determined points detected by the probe tip 23.

In block S14, the first obtaining module 202 fits a first sphere according to the coordinates of each of the first determined points and the coordinates (x, y, z) of the reference point 40, and obtains coordinates (x1, y1, z1) of a center of the first fitted sphere.

In block S15, the first obtaining module 202 determines a second group of points (hereinafter referred to as "second determined points") on a surface of the first fitted sphere according to the coordinates (x1, y1, z1) of the center of the first fitted sphere. In one embodiment, a second determined point Pi(Xi, Yi, Zi) is determined by following formulae:

$$Xi = x1 + r1 \times \cos(\beta) \times \cos(2*PI/(n-1)),$$

$$Yi = y1 + r1 \times \cos(\beta) \times \sin(2*PI/(n-1)),$$

$$Zi = z1 + r1 \times \sin(\beta),$$

In the above formulae, "r1" represents a radius of the first fitted sphere, i={1, 2, ..., n−1}, "n" represents a quantity of the second determined points (e.g., n=5), "PI" represents the circumference ratio. Xn=x1, Yn=y1, Zn=z1+r1. The angle of "β" is determined by obtaining a connection line between the second determined points "Pi" and the center of the first fitted sphere, calculating an included angle between the connection line and the reference plane of the reference sphere. In other embodiment, the angle of "β" may be a preset value (e.g., sixty degrees).

In block S16, the first obtaining module 202 moves the probe tip 23 to the second determined points (i.e., the points in the second group of points) by controlling movement of the object measuring machine 3, and obtains coordinates of each of the second determined points detected by the probe tip 23.

In block S17, the first obtaining module 202 fits a second sphere according to the coordinates of each of the second determined points, and determines the coordinates (x2, y2, z2) of the first center of the reference sphere by obtaining coordinates of a center of the second fitted sphere.

In other embodiment, the coordinates (x2, y2, z2) of the first center of the reference sphere may be determined as the coordinates (x0, y0, z0) of the initial center of the reference sphere (i.e., (x2, y2, z2)=(x0, y0, z0)), or determined as the coordinates (x1, y1, z1) of the center of the first fitted sphere (i.e., (x2, y2, z2)=(x1, y1, z1)).

Figure 6:
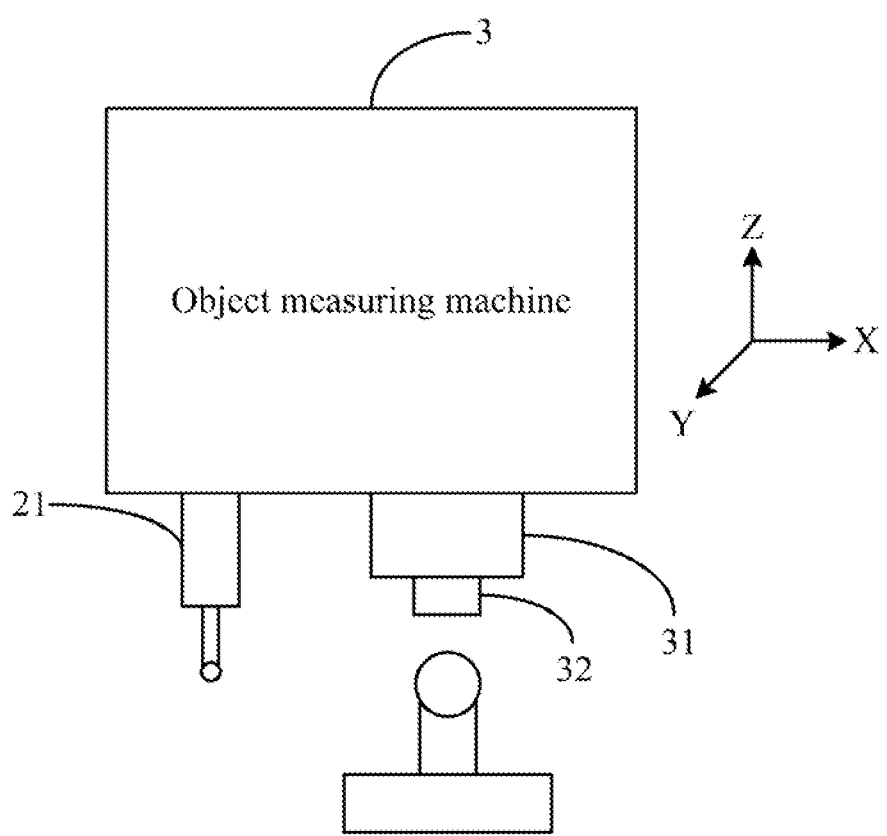
FIG. 6 is an schematic diagram of an example of moving a lens module of an image measurement system above the reference sphere.

In block S18, the second obtaining module 203 moves the lens module 32 of the image measurement system 31 above the reference sphere by controlling movement of the object measuring machine 3 according to the coordinates (x, y, z) of the reference point 40 (refers to FIG. 6), and captures an image of the reference sphere.

Figure 7:
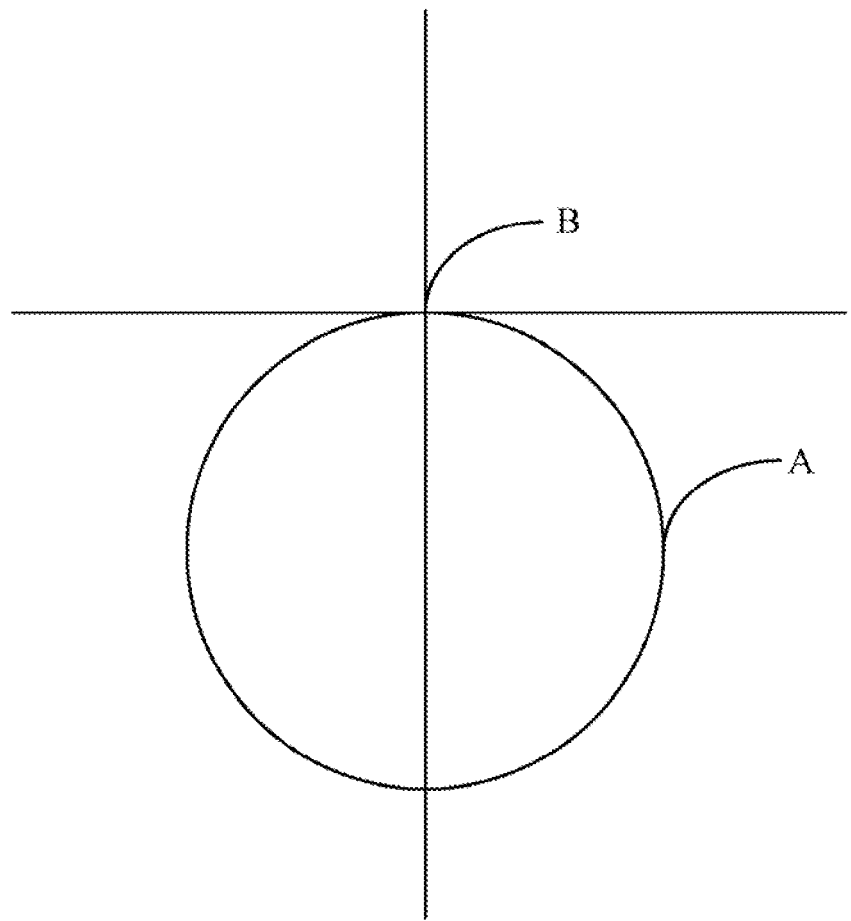
FIG. 7 is an schematic diagram of an example of a crossed line of the lens module of the image measurement system.

In other embodiments, the second obtaining module 203 adjusts a focal length of the lens module 32 until a center of a crossed line of the lens module 32 is located in a boundary of the captured image. As shown in FIG. 7, "A" represents the captured image of the reference sphere, "B" represents the center of the crossed line of the lens module 32. The adjustment of the focal length of the lens module 32 may be performed manually by a user.

In block S19, the second obtaining module 203 determines coordinates (x3, y3, z3) of a second center of the reference sphere in response to determining the second center of the reference sphere according to a center of the captured image of the reference sphere.

For example, the second obtaining module 203 obtains two-dimensional (2D) coordinates of a center of the captured image, transforms the 2D coordinates to three-dimensional (3D) coordinates in a world coordinate system (WCS) of the object measuring machine 3, and determined the 3D coordinates as the coordinates (x3, y3, z3) of the second center of the reference sphere.

In block S20, the calculating module 204 calculates difference values D(dx, dy, dz) between the coordinates (x2, y2, z2) of the first center and the coordinates (x3, y3, z3) of the second center of the reference sphere, where dx=x3−x2, dy=y3−y2, dz=z3−z2. Then, the calculating module 204 determines the difference values D(dx, dy, dz) as the regulation values between the probe measurement system 21 and the image measurement system 31. In other embodiment, the difference values D(dx, dy, dz) may be determined as follows: dx=x2−x3, dy=y2−y3, dz=z2−z3.

In block S21, the saving module 205 stores the regulation values in the storage device 28 of the electronic device 2. The coordinate regulating system 24 regulates the coordinates of the probe measurement system 21 so that the measured object 5 can be tested using both the probe measurement system 21 and the image measurement system 31.

Figure 8:
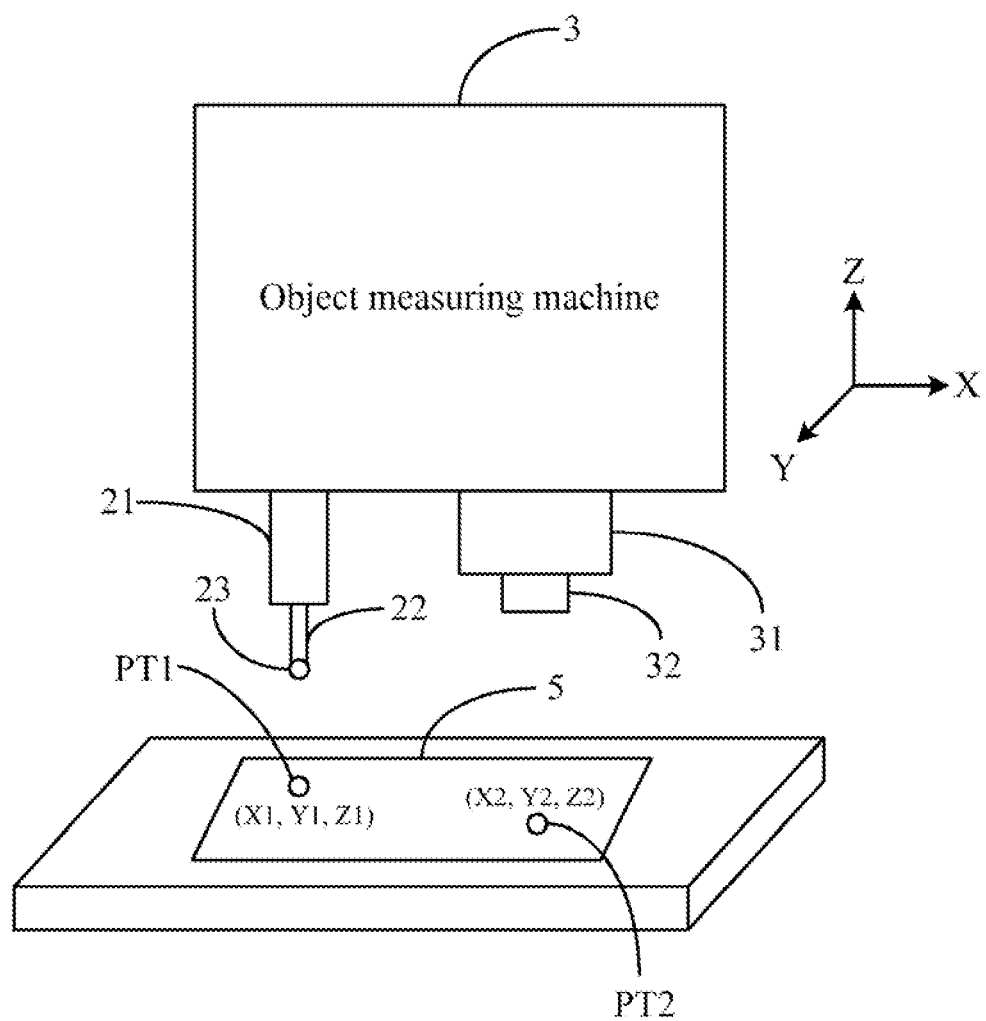
FIG. 8 is an schematic diagram of an example of regulating coordinates of the probe measurement system.

As shown in FIG. 8, if the coordinate system of the object measuring machine 3 is created based on a horizontal plane of the lens module 32 of the image measurement system 31, "PT1(X1, Y1, Z1)" and "PT2(X2, Y2, Z2)" represent two points on the measured object 5. If the probe tip 23 of the probe measurement system 21 contacts the point "PT1," the coordinates obtained by the probe tip 23 are (X2, Y2, Z2). Thus, the coordinates obtained by the probe tip 23 need to be regulated according to the regulation values between the probe measurement system 21 and the image measurement system 31. The coordinates obtained by the probe tip 23 after regulating are as follows: X1=X2+dx, Y1=Y2+dy, Z1=Z2+dz.

In other embodiments, if the difference values D(dx, dy, dz) are determined as dx=x2−x3, dy=y2−y3, dz=z2−z3, the coordinates obtained by the probe tip 23 after regulating are as follows: X1=X2−dx, Y1=Y2−dy, Z1=Z2−dz.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for regulating coordinates of a probe measurement system using an electronic device comprising a processor, the probe measurement system being included in an object measuring machine, the method comprising:
determining a reference point on a reference object detected by a probe tip of the probe measurement system;
determining coordinates (x2, y2, z2) of a first center of the reference object according to coordinates (x, y, z) of the reference point detected by the probe tip;
moving a lens module of an image measurement system above the reference object, and capturing an image of the reference object, the image measurement system being included in the object measuring machine;
determining coordinates (x3, y3, z3) of a second center of the reference object in response to determining the second center of the reference object according to a center of the captured image;
determining regulation values between the probe measurement system and the image measurement system by calculating difference values between the coordinates of the first center and the second center of the reference object; and
storing the regulation values in a storage device of the electronic device.

2. The method according to claim 1, wherein the reference object is a reference sphere.

3. The method according to claim 2, wherein the coordinates of the first center of the reference sphere are (x2, y2, z2)=(x, y, z−r), "r" representing a radius of the reference sphere.

4. The method according to claim 2, wherein the coordinates (x2, y2, z2) of the first center of the reference sphere is determined by:
obtaining coordinates (x0, y0, z0) of an initial center of the reference sphere according to the coordinates (x, y, z) of the reference point, wherein (x0, y0, z0)=(x, y, z−r), "r" representing a radius of the reference sphere;
determining a first group of points on a surface of the reference sphere according to the coordinates (x0, y0, z0) of the initial center of the reference sphere;
moving the probe tip to the first determined points, and obtaining coordinates of each of the first determined points detected by the probe tip; and
fitting a first sphere according to the coordinates of each of the first determined points and the coordinates (x, y, z) of the reference point, and determining the coordinates (x2, y2, z2) of the first center of the reference sphere by obtaining coordinates of a center of the first fitted sphere.

5. The method according to claim 4, wherein a first determined point Pi(Xi, Yi, Zi) is determined by following formulae:

$$Xi=x0+r\times Cos(\alpha)\times Cos((2*PI/3)\times i),$$

$$Yi=y0+r\times Cos(\alpha)\times Sin((2*PI/3)\times i),$$

$$Zi=z0-(r0+r)+r\times Sin(\alpha),$$

wherein "r0" represents a radius of the probe tip, i={0, 1, ..., m−1}, "m" represents a quantity of the first determined points, "PI" represents a circumference ratio, and "α" represents an included angle between a connection line of the first determined points "Pi" and the initial center of the reference sphere, and a reference plane of the reference sphere.

6. The method according to claim 2, wherein the coordinates (x2, y2, z2) of the first center of the reference sphere is determined by:
obtaining coordinates (x0, y0, z0) of an initial center of the reference sphere according to the coordinates (x, y, z) of the reference point, wherein (x0, y0, z0)=(x, y, z−r), "r" representing a radius of the reference sphere;
determining a first group of points on a surface of the reference sphere according to the coordinates (x0, y0, z0) of the initial center of the reference sphere;
moving the probe tip to first determined points, and obtaining coordinates of each of the first determined points detected by the probe tip; and
fitting a first sphere according to the coordinates of each of the first determined points and the coordinates (x, y, z) of the reference point, and obtaining coordinates (x1, y1, z1) of a center of the first fitted sphere;
determining a second group of points on a surface of the first fitted sphere according to the coordinates (x1, y1, z1) of the center of the first fitted sphere;
moving the probe tip to the second determined points, and obtaining coordinates of each of the second determined points detected by the probe tip; and
fitting a second sphere according to the coordinates of each of the second determined points, and determining the coordinates (x2, y2, z2) of the first center of the reference sphere by obtaining coordinates of a center of the second fitted sphere.

7. The method according to claim 6, wherein a second determined point Pi(Xi, Yi, Zi) is determined by following formulae:

$$Xi=x1+r1\times Cos(\beta)\times Cos(2*PI/(n-1)),$$

$$Yi=y1+r1\times Cos(\beta)\times Sin(2*PI/(n-1)),$$

$$Zi=z1+r1\times Sin(\beta),$$

wherein "r1" represents a radius of the first fitted sphere, i={1, 2, ..., n−1}, "n" represents a quantity of the second determined points, "PI" represents a circumference ratio, and "β" represents an included angle between a connection line of the second determined points "Pi" and the center of the first fitted sphere, and a reference plane of the reference sphere, and Xn=x1, Yn=y1, Zn=z1+r1.

8. An electronic device, comprising:
a storage device;
at least one processor; and
one or more modules that are stored in the storage device and executed by the at least one processor, the one or more modules comprising:
a data receiving module that determines a reference point on a reference object detected by a probe tip of a probe measurement system, the probe measurement system being included in an object measuring machine;
a first obtaining module that determines coordinates (x2, y2, z2) of a first center of the reference object according to coordinates (x, y, z) of the reference point detected by the probe tip;
a second obtaining module that moves a lens module of an image measurement system above the reference object, and capturing an image of the reference object, the image measurement system being included in the object measuring machine;

the second obtaining module that further determines coordinates (x3, y3, z3) of a second center of the reference object in response to determining the second center of the reference object according to a center of the captured image;

a calculating module that determines regulation values between the probe measurement system and the image measurement system by calculating difference values between the coordinates of the first center and the second center of the reference object; and a saving module that stores the regulation values in a storage device of the electronic device.

9. The electronic device according to claim 8, wherein the reference object is a reference sphere.

10. The electronic device according to claim 9, wherein the coordinates of the first center of the reference sphere are (x2, y2, z2)=(x, y, z−r), "r" representing a radius of the reference sphere.

11. The electronic device according to claim 9, wherein the coordinates (x2, y2, z2) of the first center of the reference sphere is determined by:

obtaining coordinates (x0, y0, z0) of an initial center of the reference sphere according to the coordinates (x, y, z) of the reference point, wherein (x0, y0, z0)=(x, y, z−r), "r" representing a radius of the reference sphere;

determining a first group of points on a surface of the reference sphere according to the coordinates (x0, y0, z0) of the initial center of the reference sphere;

moving the probe tip to the first determined points, and obtaining coordinates of each of the first determined points detected by the probe tip; and fitting a first sphere according to the coordinates of each of the first determined points and the coordinates (x, y, z) of the reference point, and determining the coordinates (x2, y2, z2) of the first center of the reference sphere by obtaining coordinates of a center of the first fitted sphere.

12. The electronic device according to claim 11, wherein a first determined point Pi(Xi, Yi, Zi) is determined by following formulae:

$$Xi=x0+r\times Cos(\alpha)\times Cos((2*PI/3)\times i),$$

$$Yi=y0+r\times Cos(\alpha)\times Sin((2*PI/3)\times i),$$

$$Zi=z0-(r0+r)+r\times Sin(\alpha),$$

wherein "r0" represents a radius of the probe tip, i={0, 1, . . . , m−1}, "m" represents a quantity of the first determined points, "PI" represents a circumference ratio, and "α" represents an included angle between a connection line of the first determined points "Pi" and the initial center of the reference sphere, and a reference plane of the reference sphere.

13. The electronic device according to claim 9, wherein the coordinates (x2, y2, z2) of the first center of the reference sphere is determined by:

obtaining coordinates (x0, y0, z0) of an initial center of the reference sphere according to the coordinates (x, y, z) of the reference point, wherein (x0, y0, z0)=(x, y, z−r), "r" representing a radius of the reference sphere;

determining a first group of points on a surface of the reference sphere according to the coordinates (x0, y0, z0) of the initial center of the reference sphere;

moving the probe tip to first determined points, and obtaining coordinates of each of the first determined points detected by the probe tip; and fitting a first sphere according to the coordinates of each of the first determined points and the coordinates (x, y, z) of the reference point, and obtaining coordinates (x1, y1, z1) of a center of the first fitted sphere;

determining a second group of points on a surface of the first fitted sphere according to the coordinates (x1, y1, z1) of the center of the first fitted sphere;

moving the probe tip to the second determined points, and obtaining coordinates of each of the second determined points detected by the probe tip; and fitting a second sphere according to the coordinates of each of the second determined points, and determining the coordinates (x2, y2, z2) of the first center of the reference sphere by obtaining coordinates of a center of the second fitted sphere.

14. The electronic device according to claim 13, wherein a second determined point Pi(Xi, Yi, Zi) is determined by following formulae:

$$Xi=x1+r1\times Cos(\beta)\times Cos(2*PI/(n-1)),$$

$$Yi=y1+r1\times Cos(\beta)\times Sin(2*PI/(n-1)),$$

$$Zi=z1+r1\times Sin(\beta),$$

wherein "r1" represents a radius of the first fitted sphere, i={1, 2, . . . , n−1}, "n" represents a quantity of the second determined points, "PI" represents a circumference ratio, and "β" represents an included angle between a connection line of the second determined points "Pi" and the center of the first fitted sphere, and a reference plane of the reference sphere, and Xn=x1, Yn=y1, Zn=z1+r1.

15. A non-transitory storage medium having stored thereon instructions that, when executed by a processor of an electronic device, causes the electronic device to perform a method for regulating coordinates of a probe measurement system, the method comprising:

determining a reference point on a reference object detected by a probe tip of the probe measurement system, the probe measurement system being included in an object measuring machine;

determining coordinates (x2, y2, z2) of a first center of the reference object according to coordinates (x, y, z) of the reference point detected by the probe tip;

moving a lens module of an image measurement system above the reference object, and capturing an image of the reference object, the image measurement system being included in the object measuring machine;

determining coordinates (x3, y3, z3) of a second center of the reference object in response to determining the second center of the reference object according to a center of the captured image;

determining regulation values between the probe measurement system and the image measurement system by calculating difference values between the coordinates of the first center and the second center of the reference object; and storing the regulation values in a storage device of the electronic device.

16. The non-transitory storage medium according to claim 15, wherein the reference object is a reference sphere.

17. The non-transitory storage medium according to claim 16, wherein the coordinates of the first center of the reference sphere are (x2, y2, z2)=(x, y, z−r), "r" representing a radius of the reference sphere.

18. The non-transitory storage medium according to claim 16, wherein the coordinates (x2, y2, z2) of the first center of the reference sphere is determined by:

obtaining coordinates (x0, y0, z0) of an initial center of the reference sphere according to the coordinates (x, y, z) of the reference point, wherein (x0, y0, z0)=(x, y, z−r), "r" representing a radius of the reference sphere;

determining a first group of points on a surface of the reference sphere according to the coordinates (x0, y0, z0) of the initial center of the reference sphere;

moving the probe tip to the first determined points, and obtaining coordinates of each of the first determined points detected by the probe tip; and fitting a first sphere according to the coordinates of each of the first determined points and the coordinates (x, y, z) of the reference point, and determining the coordinates (x2, y2, z2) of the first center of the reference sphere by obtaining coordinates of a center of the first fitted sphere.

19. The non-transitory storage medium according to claim 18, wherein a first determined point Pi(Xi, Yi, Zi) is determined by following formulae:

$$Xi = x0 + r \times Cos(\alpha) \times Cos((2*PI/3) \times i),$$

$$Yi = y0 + r \times Cos(\alpha) \times Sin((2*PI/3) \times i),$$

$$Zi = z0 - (r0 + r) + r \times Sin(\alpha),$$

wherein "r0" represents a radius of the probe tip, i={0, 1, ..., m−1}, "m" represents a quantity of the first determined points, "PI" represents a circumference ratio, and "α" represents an included angle between a connection line of the first determined points "Pi" and the initial center of the reference sphere, and a reference plane of the reference sphere.

20. The non-transitory storage medium according to claim 16, wherein the coordinates (x2, y2, z2) of the first center of the reference sphere is determined by:

obtaining coordinates (x0, y0, z0) of an initial center of the reference sphere according to the coordinates (x, y, z) of the reference point, wherein (x0, y0, z0)=(x, y, z−r), "r" representing a radius of the reference sphere;

determining a first group of points on a surface of the reference sphere according to the coordinates (x0, y0, z0) of the initial center of the reference sphere;

moving the probe tip to first determined points, and obtaining coordinates of each of the first determined points detected by the probe tip; and fitting a first sphere according to the coordinates of each of the first determined points and the coordinates (x, y, z) of the reference point, and obtaining coordinates (x1, y1, z1) of a center of the first fitted sphere;

determining a second group of points on a surface of the first fitted sphere according to the coordinates (x1, y1, z1) of the center of the first fitted sphere;

moving the probe tip to the second determined points, and obtaining coordinates of each of the second determined points detected by the probe tip; and fitting a second sphere according to the coordinates of each of the second determined points, and determining the coordinates (x2, y2, z2) of the first center of the reference sphere by obtaining coordinates of a center of the second fitted sphere.

* * * * *